United States Patent
Tsuda

(10) Patent No.: US 6,792,800 B2
(45) Date of Patent: Sep. 21, 2004

(54) LIQUID LEVEL DETECTING DEVICE

(75) Inventor: Shinji Tsuda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/771,457

(22) Filed: Feb. 5, 2004

(65) Prior Publication Data

US 2004/0163466 A1 Aug. 26, 2004

(30) Foreign Application Priority Data

Feb. 20, 2003 (JP) ........................................ 2003-042649

(51) Int. Cl.[7] ........................ G01F 23/60; H01C 10/42; H01C 10/14
(52) U.S. Cl. ............................... 73/313; 338/33; 338/73
(58) Field of Search ............................... 73/305, 322.5, 73/317; 338/73, 33

(56) References Cited

U.S. PATENT DOCUMENTS 6,276,201 B1 * 8/2001 Gette et al. .................... 73/317
6,425,288 B1 * 7/2002 Pauer .......................... 73/305
6,681,628 B2 * 1/2004 Sawert et al. ................. 73/317

FOREIGN PATENT DOCUMENTS

JP    A-2002-168675    6/2002

* cited by examiner

Primary Examiner—Hezron Williams
Assistant Examiner—Tamiko Bellamy
(74) Attorney, Agent, or Firm—Posz & Bethards, PLC

(57) ABSTRACT

A liquid level detecting device to be disposed in a liquid tank includes a body, a float arm having a float to be disposed in liquid, a resinous arm holder fixed to the body to hold the float arm so that the float arm moves as a level of the liquid changes, a circuit board fixed to the body, an elastic metal plate member having a sliding contact which slides on a sliding surface of the circuit board under a biasing force and a fixing member for fixing the elastic metal plate member to the arm holder. The resinous arm holder has an engagement hole portion and the fixing member has at least a pair of claws which extends along a slit between them and inserted into the engagement hole portion so that the pair of claws elastically deforms in a direction to narrow the slit.

5 Claims, 5 Drawing Sheets

LIQUID LEVEL DETECTING DEVICE

CROSS REFERENCE TO RELATED APPLICATION

The present application is based on and claims priority from Japanese Patent Application 2003-42649, filed Feb. 20, 2003, the contents of which are incorporated herein by reference.

BACKGROUND OF THE INVENTION

1. Field of the Invention

The present invention relates to a liquid level detecting device and, particularly a fuel level detecting device for a vehicle.

2. Description of the Related Art

JP-A-2002-168675 discloses a liquid level detecting device which includes a float arm having a float, a resinous arm holder which holds the float arm, a metal plate member which is fixed to the arm holder to move together and has a contact to slide on a sliding surface of a circuit board. The contact is biased against the sliding surface of the circuit board by the elasticity of the metal plate. Thus, the liquid level can be detected by the position of the contact. In the disclosed liquid level detecting device, the arm holder has a pin and the metal plate has a hole so that the metal plate can be fixed to the arm holder when the pin is force-fitted to the hole. The hole is burred at the inner surface thereof to increase the contact surface with the pin.

However, if the hole is burred, the diameter of the hole has to be increased excessively in order to prevent the metal plate from cracking or deforming. This increases the size of the liquid level detecting device. Otherwise, it is difficult to provide a contact that indicates an accurate position.

SUMMARY OF THE INVENTION

Therefore, a main object of the invention is to provide a compact liquid level detecting device that indicates an accurate liquid level.

Another object of the invention is to eliminate burring from the engagement hole, thereby reducing the size of the liquid level detecting device.

According to a main feature of the invention, a liquid level detecting device to be disposed in a liquid tank includes a body, a float arm having a float to be disposed in liquid, a resinous arm holder fixed to the body to hold the float arm so that the float arm moves as a level of the liquid changes, a circuit board fixed to the body, an elastic metal plate member having a sliding contact which slides on a sliding surface of the circuit board under a biasing force and a fixing member for fixing the elastic metal plate member to the arm holder, whereby the level of the liquid is indicated by the position of the sliding contact on the sliding surface. In the above constructed liquid level detecting device, the resinous arm holder has an engagement hole portion and the fixing member includes at least a pair of claws which extends along a slit formed between them and is inserted into the engagement hole portion so that the pair of claws elastically deforms in a direction to narrow the slit.

Therefore, the elastic metal plate member can be fixed to the arm holder under a biasing force acting in two different directions, so that burring is not necessary to fix the metal plate to the arm holder.

The fixing member of the above constructed liquid level detecting device may have two pairs of claws which respectively extend in opposite directions. In that case, the engagement hole portion has a pair of holes into which the two pairs of claws are inserted. Preferably, each of the engagement holes is rectangular. Therefore, the metal plate member can be prevented from rotating about an axis that is perpendicular to the surface thereof.

The resinous arm holder and the elastic plate member of the above constructed liquid level detecting device may respectively have a fixing pin and a through hole. In that case, the elastic plate member is fixed to the arm holder by the fixing pin. Therefore, the liquid level detecting device can be made compact.

In the above constructed liquid level detecting device, the fixing member may further include a projecting portion which projects from a base portion toward the engagement hole in the width direction thereof. Therefore, projecting portion functions as a power point and the base portion functions as a fulcrum.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A liquid level detecting device for a vehicle or the like according to a preferred embodiment will be described with reference to the appended drawings.

Figure 1:
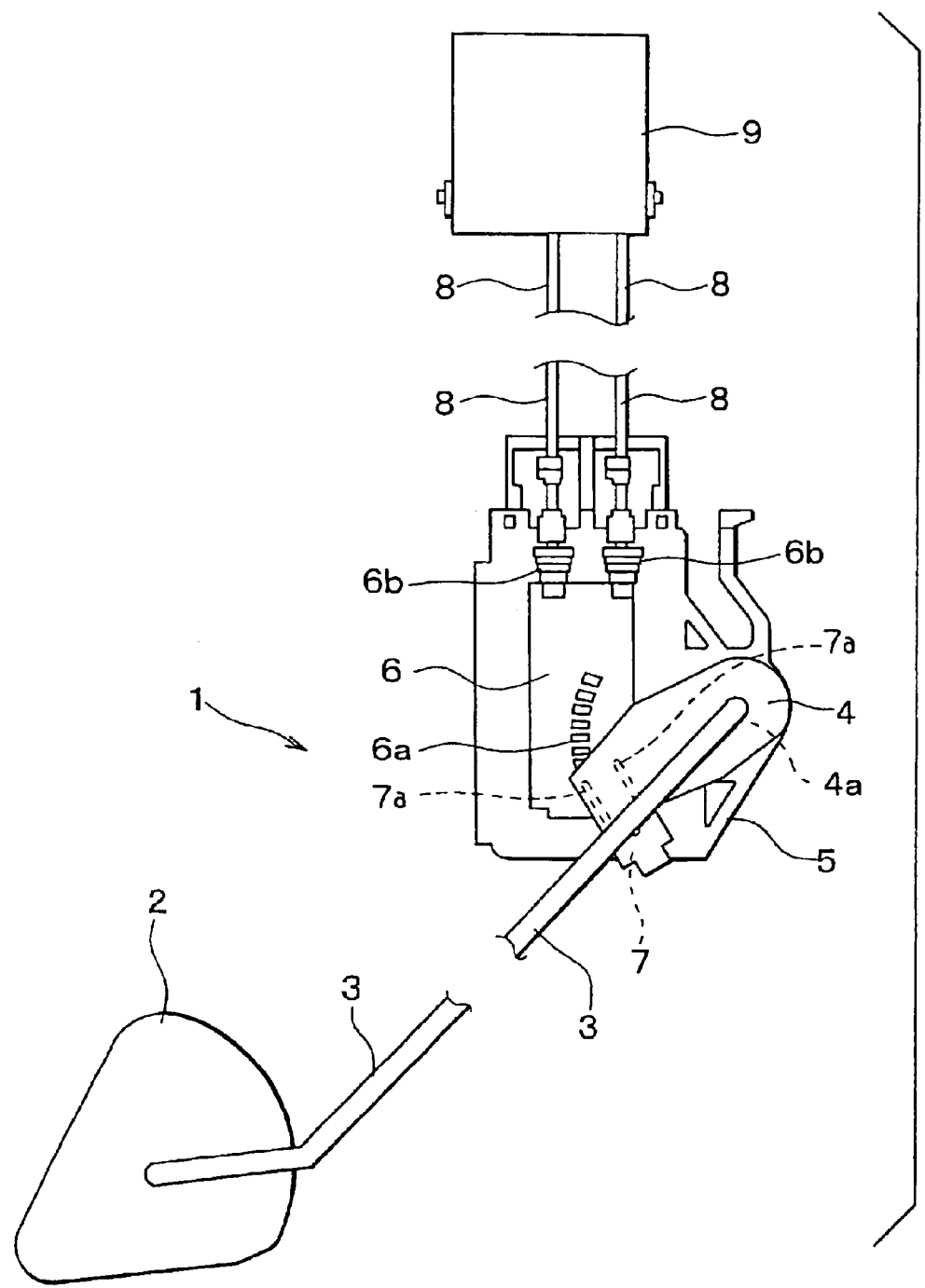
FIG. 1 is a general view of a liquid level detecting device according to a preferred embodiment of the invention.

As shown in FIG. 1, the liquid level detecting device 1 includes a float 2 to be disposed in a fuel tank, a float arm 3 which swings as the float 2 moves up or down according to change in the level of the fuel, a holder 4 which supports the float arm 3 and a body frame 5 which supports the holder 4. The float arm 3 is made of a metal rod and has one end to which the float 2 is rotatably connected and the other end which is bent in an L-shape.

Figure 2:
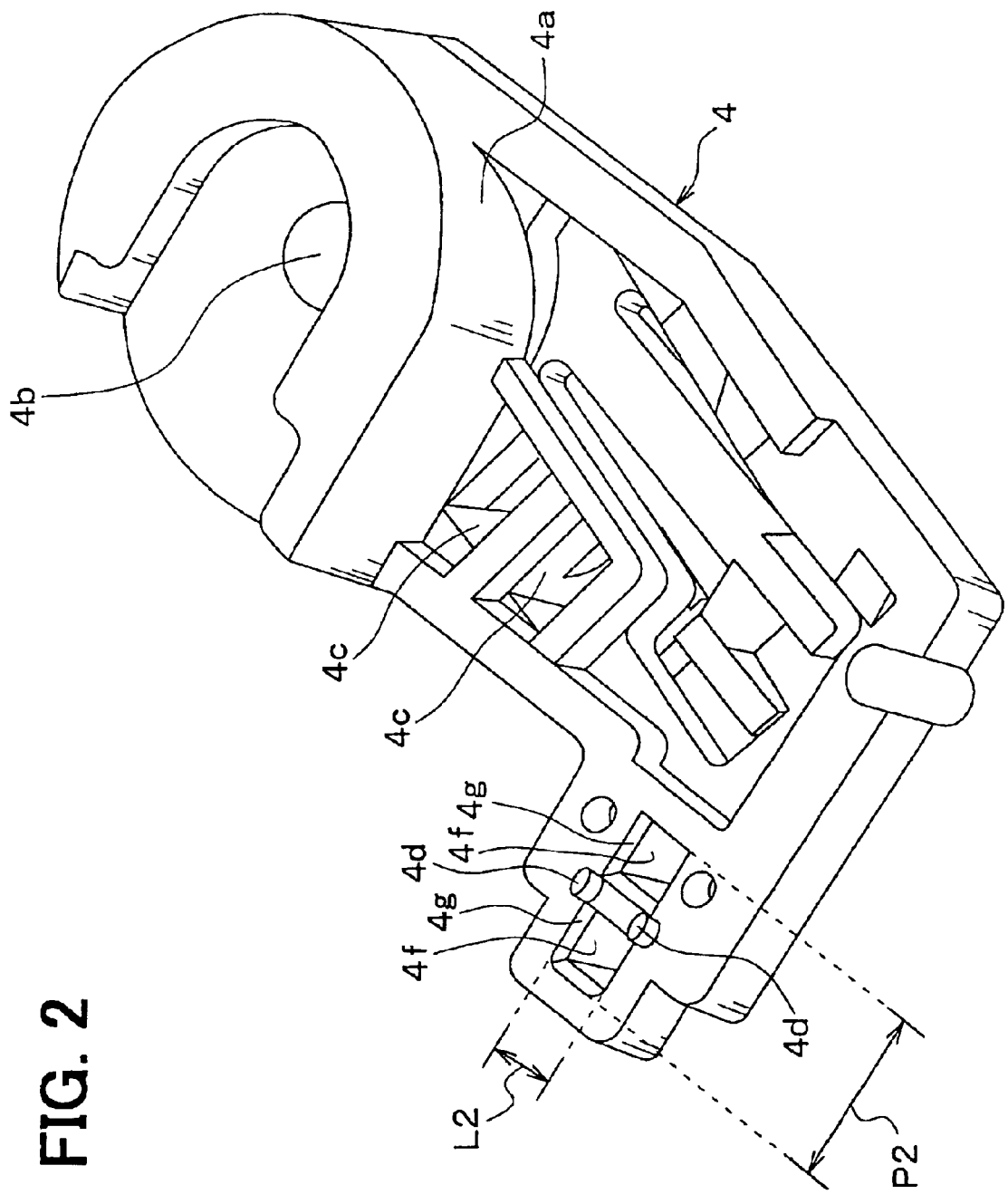
FIG. 2 is a perspective view of an arm holder of the liquid level detecting device according to the preferred embodiment.

As shown in FIG. 2, the arm holder 4 is made from resinous material. The arm holder 4 has a shaft portion 4a which is rotatably supported by the body frame 5, a through hole 4b to which the bent end of the float arm 3 is inserted. The arm holder 4 also has a pair of arm support portions 4c by which the position of the float arm 3 is fixed. The shaft portion 4a functions as a rotating axis of the float arm 3.

The body frame 5 is made from a resinous material and is fixed to a casing of a fuel pump or a bracket of the liquid level detecting device 1. A circuit board 6 is fixed to the body frame 5. The circuit board 6 has a plurality of electrodes 6a lined in an arc and connected to a resistor (not shown) and a pair of terminals 6b which are electrically connected to the electrodes 6a. Each terminal 6b is connected to an outside electric circuit by a lead wire 8. Reference numeral 9 represents a connector which is connected to an outside electric circuit.

Figure 3:
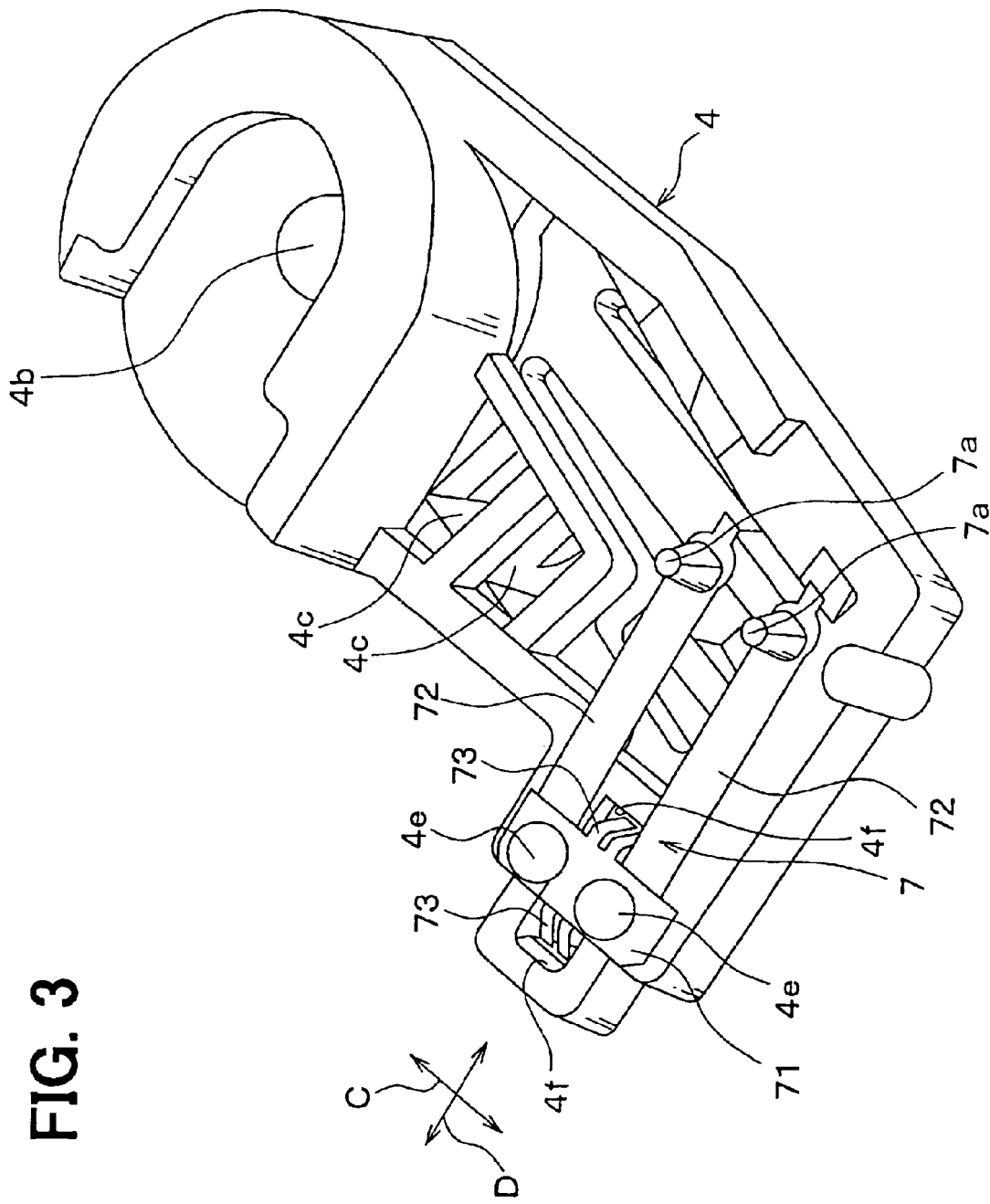
FIG. 3 is a perspective view of the arm holder with an elastic metal plate member being fixed thereto.

As shown in FIG. 3, the arm holder 4 has a springy metal plate 7 made of copper alloy such as white metal, the thickness of which is preferably between 0.05 mm and 0.2 mm. The metal plate 7 has a pair of springy arms 72, each of which has a sliding contact 7a projecting to be in contact with the electrodes 6a by spring force. The metal plate 7 is fixed to the arm holder 4 to move together with the arm holder 4.

Figure 4:
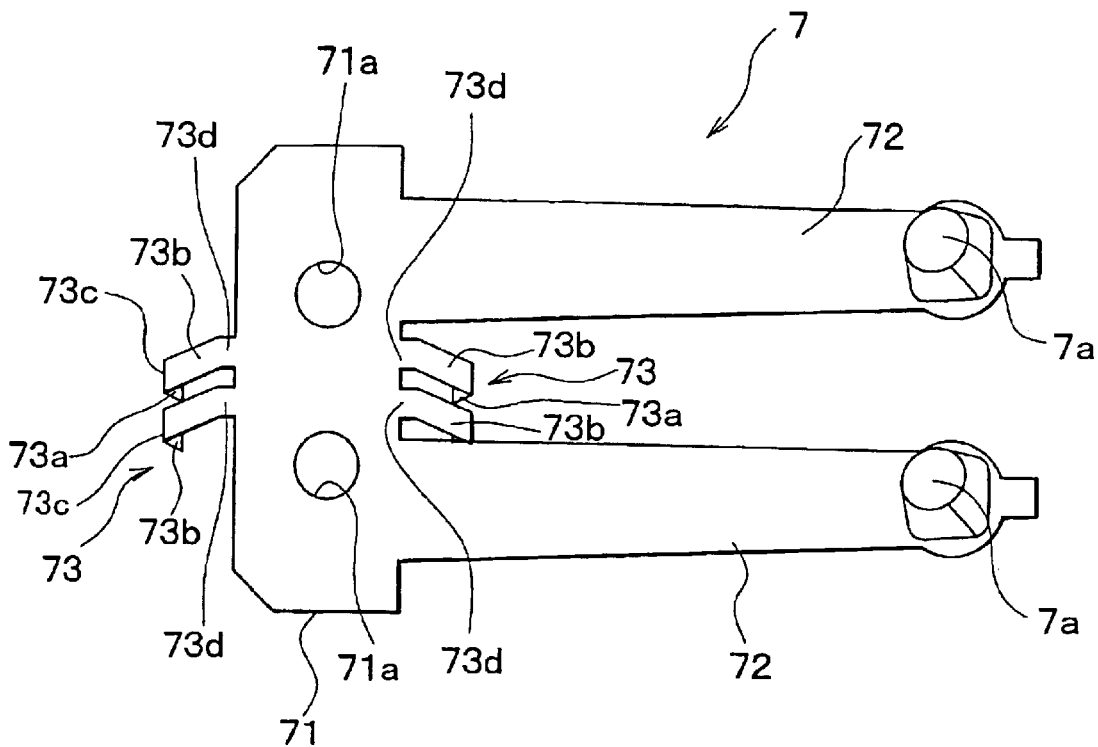
FIG. 4 is an enlarged plan view of the elastic metal plate member shown in FIG. 3.
Figure 5:
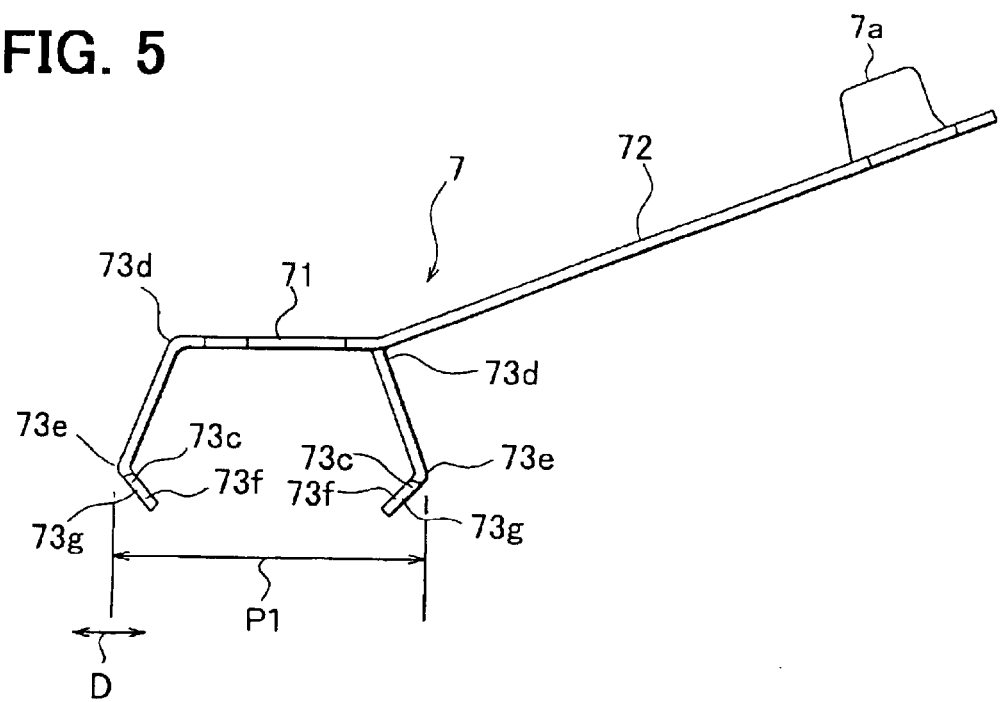
FIG. 5 is an enlarged longitudinal side view of the metal plate member shown in FIG. 4.

As shown in FIG. 4, the metal plate 7 has a base portion 71, the pair of arms 72 and a pair of claw members 73. The base portion 71 has a pair of through holes 71a, to which resinous fixing pins 4d, which is shown in FIG. 2, are inserted. The fixing pins 4d are heated to have crushed heads 4e so that the base portion 71 closely contacts with and fixes to the arm holder 4. Each arm 72 extends from the base portion 71 to the electrodes 6a along the arc-shaped line of the plurality of the electrodes 6a. As shown in FIG. 5, each arm 72 inclines to the base portion 71 and extends from the arm holder 4 so as to elastically bend and press the sliding contacts 7a against the circuit board 6. One of the sliding contact 7a contacts the electrodes 6a and the other contacts a ground pattern formed on the circuit board 6.

The pair of claw members 73 is formed of a cut-out piece of the plate member 7 to respectively project from opposite sides of the base portion 71 in opposite directions that are parallel to the arm. Each claw member 73 has a pair of claws 73b which extends in parallel with each other along a slit 73a formed between them. As shown in FIG. 3, the claw members 73 are respectively inserted into engagement holes 4f. As shown in FIG. 2, two rectangular engagement holes 4f are formed side by side in the arm holder 4 to have a width L2 and such a length that the two holes can be formed within a pitch P2.

Figure 6:
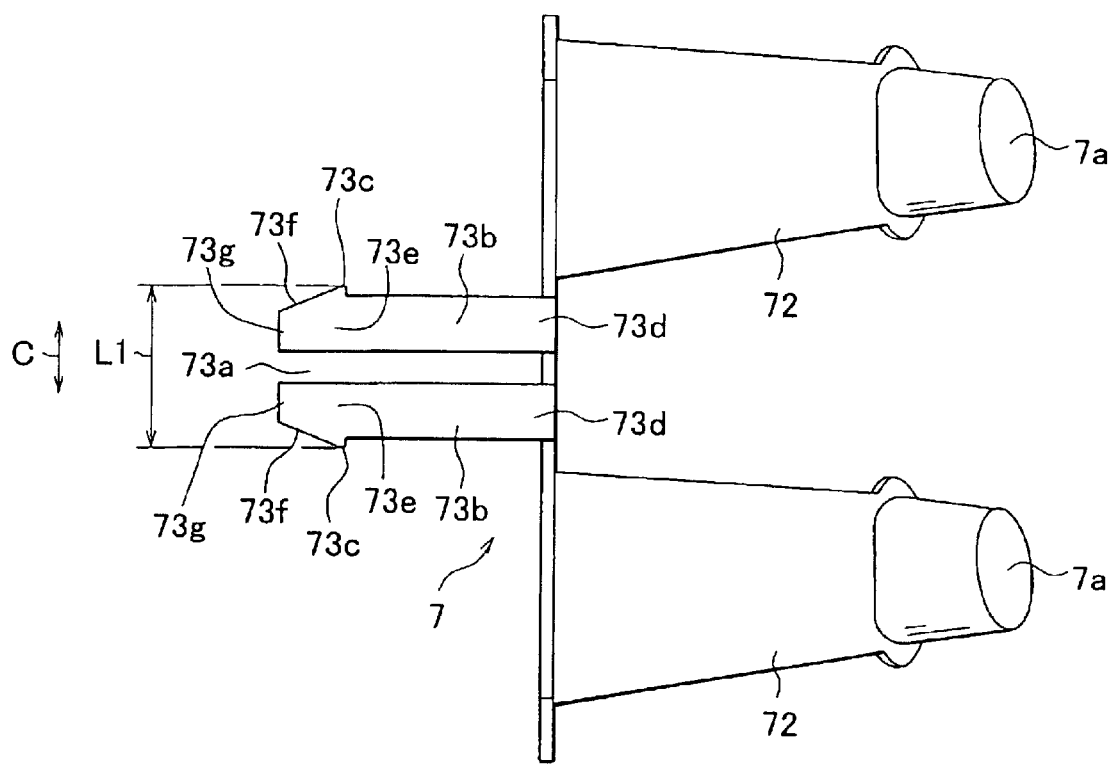
FIG. 6 is an enlarged front view of the metal plate member shown in FIG. 4.

As shown in FIG. 5, two claw members 73 are formed so that one claw member confronts the other at a maximum pitch P1 that is slightly shorter than the pitch P2 of the two rectangular engagement holes 4f. As shown in FIG. 6, each claw member 73 has a width L1 that is slightly wider than the width L2 of the engagement holes 4f. Accordingly, each pair of claws 73b elastically deforms in a direction indicated by an arrow C to narrow the slit 73a or to come closer to each other. As a result, the claw members 73 elastically deform in the piece-cut-out direction indicated by an arrow D. Thus, the metal plate 7 is elastically fixed to the arm holder 4.

As shown in FIG. 6, each claw 73b has a transversely projecting portion 73c, a base portion 73d, a longitudinally projecting portion 73e (which projects in parallel with the arm 72 as shown in FIG. 5), a tapering guide portion 73f and a hooked tip portion 73g. In other words, the transversely projecting portion 73c projects in the transverse or width direction C toward the inner walls of the engagement hole 4f. Therefore, the claw member 73 deforms in the width direction C with the projecting portion 73c functioning as a power point and the base portion 73d functioning as a fulcrum. On the other hand, the longitudinally projecting portion 73e projects in the longitudinal or long direction D toward the inner walls of the engagement hole 4f. Therefore, the claw member 73 deforms in the long direction D with the projecting portion 73e functioning as a power point and the base portion 73d functioning as a fulcrum. The tapering guide portion 73f and the hooked tip portion guide the claw member 73 into the engagement hole 4f.

In the preferred embodiment, the base portion 71, the springy arm 72 and the claw members 73 are concurrently formed by a press machine together with the through hole 71a, the sliding contact 7a, the slit 73a, the projecting portion 73c, the guide portion 73f and the bent tip portion 73g.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A liquid level detecting device to be disposed in a liquid tank comprising:

a body;

a float arm having a float to be disposed in liquid;

a resinous arm holder fixed to said body to hold said float arm so that said float arm moves as a level of the liquid changes;

a circuit board fixed to said body and having a sliding surface;

an elastic metal plate member having a sliding contact which slides on the sliding surface of said circuit board under a biasing force; and a fixing member for fixing said elastic metal plate member to said arm holder, whereby the level of the liquid is indicated by the position of the sliding contact on the sliding surface;

wherein said resinous arm holder has an engagement hole portion and said fixing member comprises at least a pair of claws which extends along a slit formed between them and inserted into said engagement hole portion so that said pair of claws elastically deforms in a direction to narrow the slit.

2. The liquid level detecting device as claimed in claim 1, wherein said fixing member comprises two pairs of claws respectively extending in opposite directions and said engagement hole portion has a pair of holes into which said two pairs of claws are inserted.

3. The liquid level detecting device as claimed in claim 2, wherein each of said engagement holes is rectangular.

4. The liquid level detecting device as claimed in claim 1, wherein said resinous arm holder has a fixing pin, and said elastic metal plate member has a through hole at a base portion thereof from which said sliding contact extends, and wherein said elastic metal plate member is fixed to said arm holder by said fixing pin.

5. The liquid level detecting device as claimed in claim 1, wherein said fixing member further comprises a projecting portion which projects toward the engagement hole in the width direction thereof.

* * * * *